US012755517B1

(12) United States Patent
Xing et al.

(10) Patent No.: US 12,755,517 B1
(45) Date of Patent: Oct. 6, 2026

(54) DIFFERENTIALLY PRIVATE OPEN-CLASSIFICATION MACHINE LEARNING MODEL TRAINING WITH ADAPTIVE CLIPPING

(71) Applicant: Amazon Technologies, Inc., Seattle, WA (US)

(72) Inventors: Yifan Xing, Kirkland, WA (US); Fanzi Wu, Bothell, WA (US); Jun Fang, Irvine, CA (US); Siqi Deng, Bellevue, WA (US); Aditya Sharad Golatkar, Los Angeles, CA (US); Alessandro Achille, Arcadia, CA (US); Dripta Sankar Raychaudhuri, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 253 days.

(21) Appl. No.: 18/536,040

(22) Filed: Dec. 11, 2023

(51) Int. Cl.

| | |
|---|---|
| ***G06V 10/776*** | (2022.01) |
| ***G06V 10/44*** | (2022.01) |
| ***G06V 10/774*** | (2022.01) |
| ***G06V 40/16*** | (2022.01) |

(52) U.S. Cl.
CPC .......... *G06V 10/774* (2022.01); *G06V 10/776* (2022.01); *G06V 40/168* (2022.01); *G06V 40/172* (2022.01)

(58) Field of Classification Search
CPC .. G06V 10/774; G06V 10/776; G06V 40/168; G06V 40/172
See application file for complete search history.

(56) References Cited

U.S. PATENT DOCUMENTS

| | | | | |
|---|---|---|---|---|
| 10,692,000 | B2 | 6/2020 | Surazhsky | |
| 10,769,415 | B1 | 9/2020 | Mostafa et al. | |
| 11,475,350 | B2 | 10/2022 | Mcmahan | |
| 11,475,684 | B1 | 10/2022 | Deng et al. | |
| 11,599,774 | B2 | 3/2023 | Zhao | |
| 11,841,977 | B2 | 12/2023 | Goldsteen | |
| 2021/0295168 | A1 * | 9/2021 | Xu | G06N 3/098 |
| 2021/0342570 | A1 * | 11/2021 | Gregson | G06V 10/764 |

(Continued)

OTHER PUBLICATIONS

Guangsheng Zhang, et al., "Label-Only Membership Inference Attacks and Defenses in Semantic Segmentation Models," Published in: IEEE Transactions on Dependable and Secure Computing ( vol. 20, Issue: 2, Mar. 1-Apr. 2023), pp. 1-15.

(Continued)

*Primary Examiner* — Iriana Cruz
(74) *Attorney, Agent, or Firm* — Alexander A. Knapp; Kowert, Hood, Munyon, Rankin & Goetzel, P.C.

(57) ABSTRACT

Methods and systems for preserving privacy and maintaining performance of machine learning models by limiting an amount of noise and data that are added by an individual member of a training dataset to a machine learning model being trained are disclosed. In some embodiments, the limiting of the noise and influence of an individual members is adaptively adjusted when performing the machine learning model training according to privacy needs of a set of individual members of the training dataset in a differentially private training system. Such techniques may be used in open-classification machine learning model training.

20 Claims, 7 Drawing Sheets

(56) References Cited

U.S. PATENT DOCUMENTS

| | | | | |
|---|---|---|---|---|
| 2022/0249868 | A1* | 8/2022 | Fay | G06N 3/045 |
| 2022/0253554 | A1 | 8/2022 | Goldsteen | |
| 2022/0383185 | A1* | 12/2022 | Zhu | G06N 3/094 |
| 2023/0078218 | A1* | 3/2023 | Wang | G06N 20/20 706/12 |
| 2024/0242312 | A1* | 7/2024 | Zhao | G06T 7/20 |
| 2025/0022263 | A1* | 1/2025 | Udhayanan | G06V 10/82 |
| 2025/0128067 | A1* | 4/2025 | Hershey | G16H 20/40 |
| 2025/0139304 | A1* | 5/2025 | Mathur | G06F 21/6245 |

OTHER PUBLICATIONS

Martin Abadi, et al., "Deep Learning with Differential Privacy," CCS '16: Proceedings of the 2016 ACM SIGSAC Conference on Computer and Communications Security, Oct. 2016, pp. 308-318, https://doi.org/10.1145/2976749.2978318.

Borja Balle, et al., "Reconstructing Training Data with Informed Adversaries," 2022 IEEE Symposium on Security and Privacy (SP), Retrieved from arXiv Preprint: arXiv:2201.04845v2, pp. 1-25.

Qiong Cao, et al., "VGGFace2: A Dataset for Recognising Faces across Pose and Age," 2018 13th IEEE International Conference on Automatic Face & Gesture Recognition (FG 2018), pp. 1-8.

"Nicholas Carlini, et al., ""Extracting Training Data from Large Language Models,"" This paper is included in the Proceedings of the 30th USENIX Security Symposium.Aug. 11-13, 2021, pp. 2633-2650."

S. Chopra, et al., "Learning a similarity metric discriminatively, with application to face verification,": 2005 IEEE Computer Society Conference on Computer Vision and Pattern Recognition (CVPR'05), Jun. 2005, pp. 1-8.

Soham De, et al., "Unlocking High-Accuracy Differentially Private Image Classification through Scale," DeepMind, Retrieved from arXiv Preprint: arXiv:2204.13650v2, pp. 1-34.

Jiankang Deng, et al., "ArcFace: Additive Angular Margin Loss for Deep Face Recognition," Proceedings of the IEEE/CVF Conference on Computer Vision and Pattern Recognition (CVPR), 2019, pp. 4690-4699.

Cynthia Dwork, et al., "Calibrating Noise to Sensitivity in Private Data Analysis," Part of the Lecture Notes in Computer Science book series (LNSC, vol. 3876), in Theory of Cryptography, pp. 265-284.

Cynthia Dwork, et al., "The Algorithmic Foundations of Differential Privacy," Foundations and Trends® in Theoretical Computer Science: vol. 9: No. 3-4, pp. 211-407. http://dx.doi.org/10.1561/0400000042.

Dan Feldman, et al., "Coresets for differentially private k-means clustering and applications to privacy in mobile sensor networks," Proceedings of the 16th ACM/IEEE International Conference on Information Processing in Sensor Networks, Apr. 2017, pp. 3-15, https://doi.org/10.1145/3055031.3055090.

Aditya Golatkar, et al., "Mixed Differential Privacy in Computer Vision," Proceedings of the IEEE/CVF Conference on Computer Vision and Pattern Recognition (CVPR), 2022, pp. 8376-8386.

Ian J. Goodfellow, et al., "Explaining and Harnessing Adversarial Examples," Published as a conference paper at ICLR 2015, Retrieved from arXiv Preprint: arXiv:1412.6572v3, Mar. 2015, pp. 1-11.

Kaiming He, et al., "Deep Residual Learning for Image Recognition," Proceedings of the IEEE Conference on Computer Vision and Pattern Recognition (CVPR), 2016, pp. 770-778.

Weiyang Liu, et al., "SphereFace: Deep Hypersphere Embedding for Face Recognition," Proceedings of the IEEE Conference on Computer Vision and Pattern Recognition (CVPR), 2017, pp. 212-220.

Brianna Maze, et al., "IARPA Janus Benchmark—C: Face Dataset and Protocol," 2018 International Conference on Biometrics (ICB), pp. 1-8.

Qiang Meng, et al., "Improving Federated Learning Face Recognition via Privacy-Agnostic Clusters," Published as a conference paper at ICLR 2022, Retrieved from arXiv:2201.12467v1, Jan. 2022, pp. 1-21.

Kobbi Nissim, et al., "Locating a Small Cluster Privately," Proceedings of the 35th ACM SIGMOD-SIGACT-SIGAI Symposium on Principles of Database Systems ,Jun. 2016, pp. 413-427, https://doi.org/10.1145/2902251.2902296.

Nicolas Papernot, et al., "Semi-supervised Knowledge Transfer for Deep Learning from Private Training Data," Published as a conference paper at ICLR 2017, Retrieved from arXiv:1610.05755v4, Mar. 2017, pp. 1-16.

Nicolas Papernot, et al., "Scalable Private Learning with PATE," Published as a conference paper at ICLR 2018, Retrieved from arXiv:1802.08908v1, pp. 1-34.

Alexandre Sablayrolles, Matthijs Douze, Cordelia Schmid, Yann Ollivier, Herve Jegou, "White-box vs Black-box: Bayes Optimal Strategies for Membership Inference," Proceedings of the 36th International Conference on Machine Learning, PMLR 97: pp. 5558-5567, 2019.

Florian Schroff, et al., "FaceNet: A Unified Embedding for Face Recognition and Clustering," Proceedings of the IEEE Conference on Computer Vision and Pattern Recognition (CVPR), 2015, pp. 815-823.

Mahmood Sharif, et al., "Accessorize to a Crime: Real and Stealthy Attacks on State-of-the-Art Face Recognition," Proceedings of the 2016 ACM SIGSAC Conference on Computer and Communications Security, Oct. 2016, pp. 1528-1540, https://doi.org/10.1145/2976749.2978392.

Reza Shokri, et al., "Membership Inference Attacks Against Machine Learning Models," 2017 IEEE Symposium on Security and Privacy (SP), arXiv:1610.05820v2, Mar. 2017, pp. 1-16.

Kihyuk Sohn, "Improved Deep Metric Learning with Multi-class N-pair Loss Objective," NeurIPS Proceedings, Part of Advances in Neural Information Processing Systems 29 (NIPS 2016), pp. 1-9.

"Uri Stemmer, Haim Kaplan, ""Differentially Private k-Means with Constant Multiplicative Error,"" Part of Advances in Neural Information Processing Systems 31 (NeurIPS 2018), pp. 1-11."

Florian Tramèr, Dan Boneh, Differentially Private Learning Needs Better Features (or Much More Data), Published as a conference paper at ICLR 2021, Retrieved from arXiv:2011.11660v3, Feb. 2021, pp. 1-25.

Fatemeh Vakhshiteh, et al., "Adversarial Attacks Against Face Recognition: A Comprehensive Study," Published in: IEEE Access ( vol. 9), 2021, pp. 1-23.

Hao Wang, et al., "CosFace: Large Margin Cosine Loss for Deep Face Recognition," Proceedings of the IEEE Conference on Computer Vision and Pattern Recognition (CVPR), 2018, pp. 5265-5274.

Kai Wang, et al., "FaceMAE: Privacy-Preserving Face Recognition via Masked Autoencoders," arXiv preprint: arXiv:2205.11090v1, May 2022, pp. 1-12.

Yandong Wen, et al., "SphereFace2: Binary Classification is All You Need for Deep Face Recognition," Published as a conference paper at ICLR 2022, arXiv:2108.01513v3 Apr. 2022, pp. 1-16.

Cameron Whitelam, et al., "IARPA Janus Benchmark-B Face Dataset," Proceedings of the IEEE Conference on Computer Vision and Pattern Recognition (CVPR) Workshops, 2017, pp. 90-98.

Dong Yi, Zhen Lei, Shengcai Liao, Stan Z. Li, "Learning Face Representation from Scratch," arXiv:1411.7923v1, Nov. 2014, pp. 1-9.

* cited by examiner

DIFFERENTIALLY PRIVATE OPEN-CLASSIFICATION MACHINE LEARNING MODEL TRAINING WITH ADAPTIVE CLIPPING

BACKGROUND

In some situations, training data used to train a machine learning model that outputs a generated representation, such as a face embedding, may be vulnerable to having elements of the training data discovered via inference attacks. For example, an attacker may be able to use results received from multiple inferences generated by a trained machine learning model in order to infer information about specific instances of training data used to train the machine learning model. However, privacy of the training data can be at least partially protected by using differentially private training, wherein random noise is added in a proportional amount to the training data. But, adding noise to the training data can also negatively impact the training, so it is preferable to use an influence value to limit the amount of influence both the added noise and each given instance of training data have with respect to model training. However, an inflexible influence value may be non-ideal, given the actual effects of the instances of training data on the training are variable. For example, some instances of training data vary significantly more than others with respect to a set of instances of training data included in a training data set and therefore may have a greater impact on training than other instances of training data of the training data set.

Figure 1:
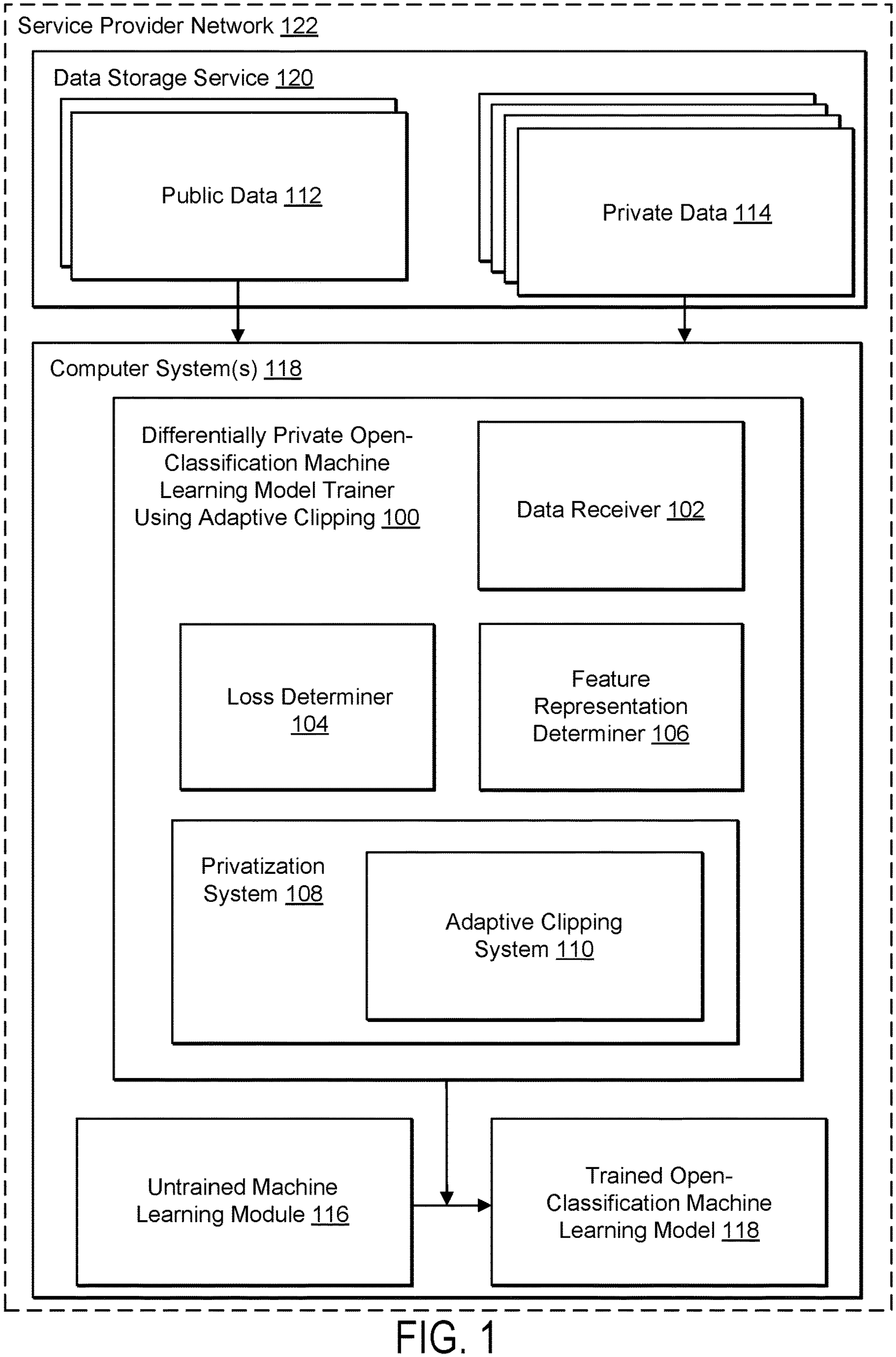
FIG. 1 is a block diagram illustrating possible components of a differentially private open-classification machine learning model training system with adaptive clipping, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION

Methods and systems for limiting the amount of noise and data added by an individual member of a training dataset to machine learning model training according to the privacy needs of a set of individual members of the training dataset in a differentially private training system are described.

For example, a machine learning model may be trained to perform facial recognition using, as training data, a set of images that include faces. However, for privacy reasons, it may be desirable to train the model in a way that the faces included in the set of training data images remain private. For example, maintaining privacy of the training data (or portions of the training data) may include limiting an impact of any one instance of training data on how the model is trained, such that inferences generated by the trained model cannot be used to determine an identity included in training data used to train the model. Said another way, in the context of facial recognition, maintaining privacy includes training the machine learning model in a way that the identity of faces used in the training cannot be inferred from inference results generated using the trained machine learning model.

For example, a gradient value of a given instance of training data may be clipped, for example to limit the amount of influence the difference between the given instance of the training data and the remaining members of the training data has on determining weights of the trained model. However, simply clipping all gradient values by the same amount may lead to sub-optimal results. For example, data that may have otherwise been useful in training the model may be discarded due to the clipping, or more noise than is useful may be added. To address this trade-off, in some embodiments, adaptive clipping is used, wherein an amount of clipping applied is adaptively adjusted based on variance between a given instance of private training data and public training data and/or based on a variance between a given instance of private training data and a set of other members of the training data that are most similar (e.g., nearest neighbors in attribute vector space) as the given instance for which a gradient value is being clipped. Adaptive clipping may allow for more useful gradient information to remain (after the clipping) available for improving model training, while at the same time ensuring that privacy criteria with regards to individual instances of the training data are enforced.

An open-classification machine learning model may have an unlimited possible number of classifiers. Classifiers may be groups into which new data is meant to be sorted and open-classification machine learning models may determine that a new group is needed in which to sort data that does not correspond to an existing group. For example, a facial recognition system may use an open-classification machine learning model which has identities as classifications, which may be added to the model while the model is in use because the model is shown a picture including the face of a person who the model has not previously seen.

More specifically, an open-classification machine learning model may be trained by finding a feature extractor ($\phi$) and a classifier $W=[w_1, \ldots, w_M]$, where M is the number of classifications in the entire training dataset, using a family of losses ($\mathcal{L}$), for example as used in open-classification machine learning model training. Single iterations of the loss value $l_i(w)=\mathcal{L}(w, x_i, y_i)$ may be calculated, where i is the number label for an individual data sample, where x is a face image, and where y is an identity label integer from 1 to M. The calculated family of losses may be closely related to a weight value (w) used in training the machine learning model. For example, the weight value may be used in calculating $\mathcal{L}$ and thereby training the machine learning model. In some embodiments, Stochastic Gradient Descent (SGD) may be used to find the weight value, such that $$w^{(t+1)} = w^{(t)} - \eta_t \frac{1}{B} \sum\nolimits_{i \in \mathcal{B}^t} \nabla l_i(w^{(t)}),$$

where t represents the iteration number, $\eta$ is the step-size, and $\mathcal{B}^t$ is the set of instances of training data in the training data set used in the given training iteration (such as face images $x_i$). Note that $\mathcal{B}^t$ is related to B as $|\mathcal{B}^t|=B$. The stochastic gradient descent (SGD) weight value formula is used as an example in this specification. However, those skilled in the art will recognize that in some embodiments the disclosed adaptive clipping operations may be used with other optimization methods, other than stochastic gradient descent. Also, in some embodiments, data other than face images may be used as $x_i$, depending on the intended use of the machine learning model that is being trained. For clarity, face images will be referred to as the underlying data in the following discussion, but it should be understood that the disclosed adaptive clipping operations may be used with any type of training data used to train a machine learning model to perform various tasks, while still maintaining privacy with regard to the training data.

Training the machine learning model using calculated weight values (w) may be made differentially private for each $x_i$ by clipping the gradients of the loss values ($l_i$) in single iterations of the training to limit the loss values to not exceed an influence value and adding random noise proportional to that influence value. In some embodiments, a standard random Gaussian noise distribution, defined by the variable $\xi$, where $\xi \sim \mathcal{N}(0, 1)$ may be added to the loss values such that the weight value may be calculated with the following equation where C is the influence value:

$$w^{(t+1)} = w^{(t)} - \eta_t \left\{ \frac{1}{B} \sum_{i \in \mathcal{B}^t} \mathrm{clip}_C \nabla l_i(w^{(t)}) + \frac{\sigma C}{B} \xi \right\}$$

As seen above, the influence value (C) is used to clip the gradients used in finding the weight value and is used to determine how much noise is added. However, calculating a weight value w based on the above equation may reduce the effectiveness of the trained model due to a large amount of noise added in early iterations when the gradients are relatively larger. Using a set of publicly available images that do not need to be protected (which may be represented as $\mathcal{B}_{pub}$, a set of public data) in addition to a set of non-publicly available images (which may be represented as $\mathcal{B}_{pri}$, a set of private data) may help avoid the reduced effectiveness in the trained model. The set of public data may be smaller than the set of private data. A weight value for such a mixed dataset used to train the machine learning model may be found by the following equation where j represents the number label of the samples of public data:

$$w^{(t+1)} = w^{(t)} - \frac{1}{B_{pub}} \sum_{j \in \mathcal{B}^t_{pub}} \nabla l_j(w^{(t)}) - \eta_t \left\{ \frac{1}{B_{pri}} \sum_{i \in \mathcal{B}^t_{pri}} \mathrm{clip}_C \nabla l_i(w^{(t)}) + \frac{\sigma C}{B_{pri}} \xi \right\}$$

As seen in the public and private data weight value calculation above, public data does not need to be protected, so the gradients of the public data are not clipped and noise is not added for the public data. A differentially private open-classification machine learning model training system with adaptive clipping (e.g., adaptive clipping machine learning model trainer) may adjust this public and private data weight value calculation at every iteration by adaptive clipping or adjusting the influence value C according to the samples used in the given iteration. The influence value can be represented in different forms, such as with variables other than C, including –C, wherein C is a negative value, or $$\frac{1}{C}.$$

The influence value is the variable that is used in the clipping function of a differentially private weight calculation for a single iteration of partial training and is referred to throughout this specification as C or $C_t$. The influence value is a real number greater than 0. There may also be a scaling threshold for the influence value C, for example such that $C \leq 1$. An adaptive clipping machine learning model trainer may perform adaptive clipping for C by using the gradient norms of the individual members of the set of public data the individual iteration of partial training is using (represented as $G_{pub}$). An adaptive clipping machine learning model trainer may use statistical operations, for example a particular quantile of the public data gradient norms, to adjust the influence value, for example:

$$C_t = \min\left\{C_{t-1}, \frac{\text{quantile}_{90}(G_{pub})}{K}\right\}$$

In the above equation, the influence value is the lower of the previous iteration's influence value or the $90^{th}$ quantile of $G_{pub}$ scaled by a factor K to ensure usability. In some embodiments K may be 1. This equation in combination with the public and private data weight value calculation above may avoid unusually influential individual members of private data influencing the machine learning model during training beyond what the public data indicates is a statistically relevant amount of influence. The above equation may also ensure that the amount of influence of later training iterations is equal to or lower than the amount of influence of prior training iterations, which may keep training consistent despite occasional unusual data samples. Some embodiments may use a similar strategy where the proximity between the feature representations ($x_{pub}$) of individual ones of the private data and the feature representations ($x_{pri}$) of individual ones of the public data are used to determine the appropriate set of $G_{pub}$ gradient norms. For each member of the public data, the adaptive clipping machine learning model trainer may select the nearest member of the public data and may perform the statistical operation using the set of selected members of the public data, which may include or exclude duplicate members. The adaptive clipping machine learning model trainer may also select individual members of the public data using cluster centers of feature representations of the members of private data instead of individual members. This nearest neighbor strategy may tailor C to the private data without directly using the private data, and may be summarized by the example equation, where $\mathcal{N}(\mathcal{B}_{pri}, \mathcal{B}_{pub})$ represents determining the nearest $x_{pub}$ for each $x_{pri}$ by Euclidean distance or cosine similarity:

$$C_t = \min\left\{C_{t-1}, \frac{\text{quantile}_{90}(G_{pub})[\mathcal{N}(\mathcal{B}_{pri}, \mathcal{B}_{pub})])}{K}\right\}$$

This method of adjusting an influence value for adaptive clipping may be used in determining weight values w and loss values $\mathcal{L}$ for a number of differentially private open-classification machine learning model training strategies.

Public data may be a set of data not subject to privacy constraints. Private data may be a set of data subject to privacy constraints. The terms public data and private data are used in this specification, although the public data and private data may be respectively a first set of data and a second set of data.

FIG. 1 is a block diagram illustrating possible components of a differentially private open-classification machine learning model training system with adaptive clipping, according to some embodiments.

FIG. 1 shows an example system that may be used to implement a differentially private open-classification machine learning model trainer using adaptive clipping 100. A data receiver 102 may receive public data 112 and private data 114 from a data storage service 120. A feature representation determiner 106 may extract data in a usable format from the received public data 112 and private data 114. There may be more private data 114 than there is public data 112. An adaptive clipping system 110 may determine an influence value for an iteration of partial training according to an equation similar to one shown above, based on the gradients of the public data. The determined influence value may be used by the privatization system 108 to adjust influence value in a data privatization mechanism such as the one described in the public and private data weight value calculation. The loss determiner 104 may receive the privatized data from the privatization system 108 for training an untrained machine learning module 116. The output of this training may be a trained open-classification machine learning model 118.

Public data 112, such as publicly available images, may be accessible to a large number of people via the public Internet. Public data 112 may be from a collection of data intended for use in training machine learning models. However, public data 112 may not have sufficient variation to train a machine learning model to a desired quality level, for example, because public data 112 such as publicly available face images may on average exclude some facial poses. Private data 114, such as non-publicly available images, may be stored on private servers within a service provider network 122 that are not accessible to people other than the individual customers using the private servers. Some customers may opt-in to allowing their private data 114 to be used for the purpose of training machine learning models with adequate privacy protection, e.g., the protection provided by an adaptive clipping machine learning model trainer. An adaptive clipping machine learning model trainer protects not only the specific data used but also the category of data the specific data is associated with, e.g., the identity of a person represented in an image is protected from discovery in addition to the specific image. The private data 114 may include more total data than public data 112 and may include data that is generally excluded from public data 112. Thus, private data 114 may provide substantial benefits to machine learning model training, in addition to the benefits provided by adaptive clipping. For example, a machine learning model trained with private data in addition to (or instead of) public data may achieve higher levels of performance than machine learning models trained only with public data.

As an example, consider a machine learning model that is trained to identify faces in images. Because images included in public data sets may have a disproportionate number of images where faces are present due to people posing for pictures (such as photos licensed as a public data set for facial recognition training) a machine learning model trained only on such public data sets may exhibit poor performance when attempting to identify faces in images other than posed pictures. In contrast, a machine learning model that is additionally trained with private data sets may be trained with a greater diversity of image types and therefore provide better performance when tasked with identifying faces in a larger variety of images. Public data may be data for which an entity has permission of all relevant rightsholders (including the entities pictured) to use the data in training a given model and to disclose that the data has been used to train the given model. Private data may be data for which an entity has permission of all relevant rightsholders (including the entities pictured) to use the data in training a given model in a privacy preserving manner (e.g., in the manner disclosed herein), such that disclosure that the data has been used to train the model is reduced or eliminated.

Figure 7:
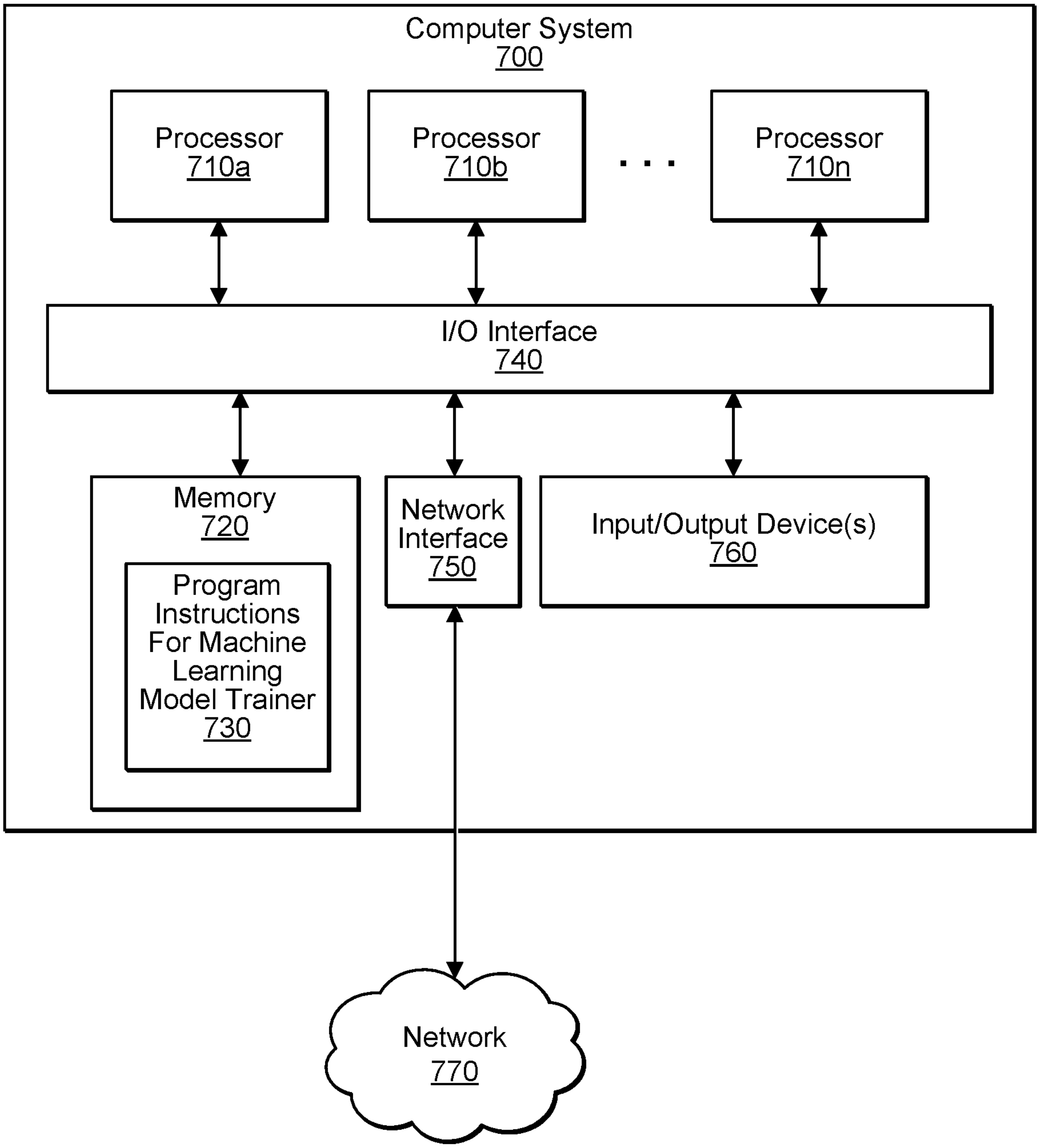
FIG. 7 illustrates a block diagram illustrating an example computer system that implements some or all of the techniques described herein, according to some embodiments.

A differentially private open-classification machine learning model trainer using adaptive clipping 100 may be implemented on a computer system(s) 118, which may be a computer system 700 as described in FIG. 7. The computer system(s) 118 and data storage service 120 may be parts of a larger service provider network 122.

In some embodiments, a service provider network 122 may be a cloud provider network. A cloud provider network may have broad access to private data 114. A cloud provider network, such as service provider network 122, may provide access to computing resources via a defined set of regions, availability zones, and/or other defined physical locations where a cloud provider network includes data centers in one or more regions. In many cases, each region represents a geographic area (e.g., a U.S. East region, a U.S. West region, an Asia Pacific region, and the like) that is physically separate from other regions, where each region can include two or more availability zones connected to one another via a private high-speed network, e.g., a fiber communication connection. In some embodiments service provider network 122 may include multiple physical or infrastructure availability zones, where a physical or infrastructure availability zone (also known as an availability domain, or simply a "zone") refers to an isolated failure domain including one or more data center facilities with separate power, separate networking, and separate cooling from those in another availability zone. Preferably, physical availability zones within a region are positioned far enough away from one other that the same natural disaster should not take more than one availability zone offline at the same time, but close enough together to meet a latency requirement for intra-region communications.

Furthermore, regions of a cloud provider network, such as service provider network 122, may be connected to a global "backbone" network which includes private networking infrastructure (e.g., fiber connections controlled by the cloud provider) connecting each region to at least one other region. This infrastructure design enables users of a cloud provider network, such as service provider network 122, to design their applications to run in multiple physical availability zones and/or multiple regions to achieve greater fault-tolerance and availability. For example, because the various regions and physical availability zones of a cloud provider network, such a service provider network 122, are connected to each other with fast, low-latency networking, users can architect applications that automatically failover between regions and physical availability zones with minimal or no interruption to users of the applications should an outage or impairment occur in any particular region.

The traffic and operations of the service provider network 122 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

A service provider network 122 may include a virtual compute service. A virtual compute service may offer various compute instances to users/clients. A virtual compute instance may, for example, be implemented on one or more resource hosts that comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service in different embodiments, including special purpose computer servers, storage devices, network devices and the like. In some embodiments instance clients or any other users may be configured (and/or authorized) to direct network traffic to a compute instance. In various embodiments, compute instances may attach or map to one or more data volumes provided by a block-based storage service in order to obtain persistent block-based storage for performing various operations.

Compute instances may operate or implement a variety of different platforms, such as general purpose operating systems, application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client to access an instance.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc., and (in the case of reserved compute instances) reservation term length.

In various embodiments, service provider network 122 may also implement a block-based storage service for providing storage resources and performing storage operations. A block-based storage service is a storage system, composed of a pool of multiple independent resource hosts (e.g., server block data storage systems), which provide block level storage for storing one or more sets of data volumes. Data volumes may be mapped to particular clients, providing virtual block-based storage (e.g., hard disk storage or other persistent storage) as a contiguous set of logical blocks. In some embodiments, a data volume may be divided up into multiple data chunks (including one or more data blocks) for performing other block storage operations, such as snapshot operations or replication operations.

In some embodiments, data storage service 120 may be an object-based storage service that stores public data 112 and/or private data 114 using a plurality of resource hosts. For example, data storage service 120 may store large quantities of customer data in an efficient manner wherein customer data is stored as data objects with associated keys. As discussed above, customers of data storage service 120, which may be an object-based storage service, block-based storage service, etc. may opt into allowing face images stored in the data storage service to be used for machine learning model training with privacy protection, such as adaptive clipping. In some embodiments, the implementation of the machine learning model trainer with adaptive clipping in a cloud setting may provide greater access to training data than is possible in other implementation settings and therefore may result in higher performance results of machine learning models trained using the cloud-based machine learning model trainer with adaptive clipping, for example as compared to results than would be possible in other implementation configurations.

In addition to data storage services (such as data storage service 120), a service provider network 122 may implement other network-based services, which may include various different types of analytical, computational, storage, or other network-based system allowing users/clients, as well as other services of service provider network 122 (e.g., block-based storage service, virtual compute service, cache storage service, and/or object-based storage service) to perform or request various tasks. In some embodiments, customers of such other services may opt-in to allowing face images to be used to train a machine learning model, with privacy protections, such as adaptive clipping, enforced.

Customers/clients of service provider network 122 and/or data storage service 120 may convey network-based services requests to the service provider network 122 via an external network. In various embodiments, an external network may encompass any suitable combination of networking hardware and protocols necessary to establish network-based communications between clients and the service provider network 122. For example, a network may generally encompass the various telecommunications networks and service providers that collectively implement the Internet. A network may also include private networks such as local area networks (LANs) or wide area networks (WANs) as well as public or private wireless networks. For example, both a given client and service provider network 122 may be respectively provisioned within enterprises having their own internal networks. In such an embodiment, a network may include the hardware (e.g., modems, routers, switches, load balancers, proxy servers, etc.) and software (e.g., protocol stacks, accounting software, firewall/security software, etc.) necessary to establish a networking link between given client and the Internet as well as between the Internet and the service provider network 122. It is noted that in some embodiments, clients may communicate with the service provider network 122 using a private network rather than the public Internet.

Figure 2:
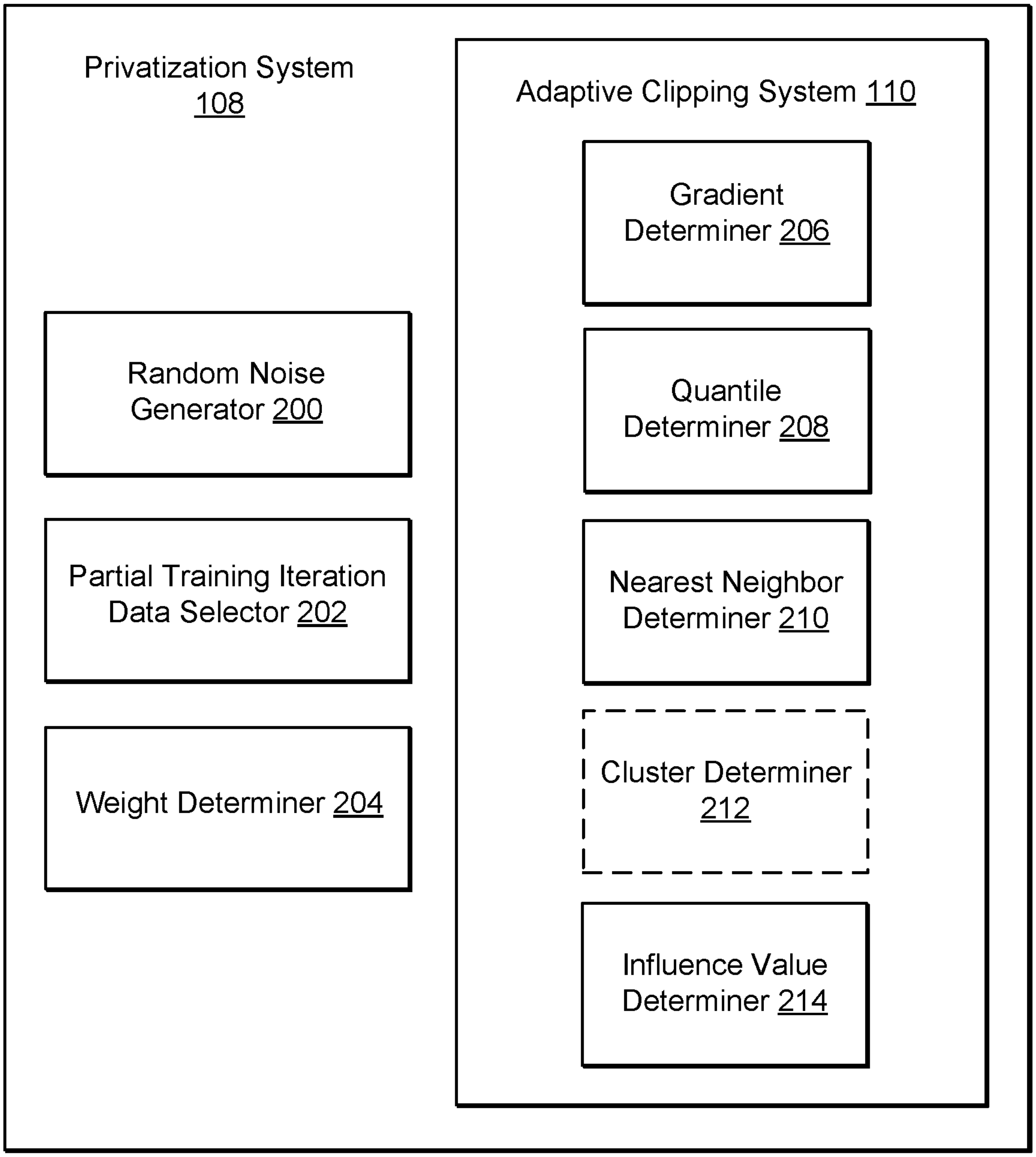
FIG. 2 is a block diagram illustrating possible components of a privatization system that may be used in a differentially private open-classification machine learning model training system with adaptive clipping, according to some embodiments.

FIG. 2 is a block diagram illustrating possible components of a privatization system that may be used in a differentially private open-classification machine learning model training system with adaptive clipping, according to some embodiments.

FIG. 2 shows a more detailed view of the privatization system 108 and adaptive clipping system 110. In addition to the influence value received from the adaptive clipping system 108, the privatization system 108 may use a random noise generator 200 to generate the noise that may be added to the private data samples in a calculation performed by a weight determiner 204. Weight determiner 204 may perform calculations similar to the public and private data weight value calculations described above. A partial training iteration data selector 202 may select the individual members of public data and private data that are used in the iteration of partial training.

The adaptive clipping system 110 may include components such as the gradient determiner 206 and the nearest neighbor determiner 210 that extract information from the individual members of public data and private data that are used in the iteration of partial training. The gradient determiner 206 may determine the gradient norms of the individual members of the public data, and the nearest neighbor determiner 210 may determine the nearest individual member(s) of public data to one or more of the individual members of private data. The nearest neighbor determiner 210 may use cluster centers of feature representations of the one or more of the individual members of the private data, which may be provided by a cluster determiner 212, to determine nearest neighbors. A quantile determiner 208, or a module that determines another statistic, may determine which gradient norm of the gradient norms of the individual members of the public data the influence value determiner 214 should use. The influence value determiner 214 may use an equation similar to one of the equations described above to find $C_t$, the influence value, which may be the influence value of the immediately prior iteration of partial training.

Figure 3:
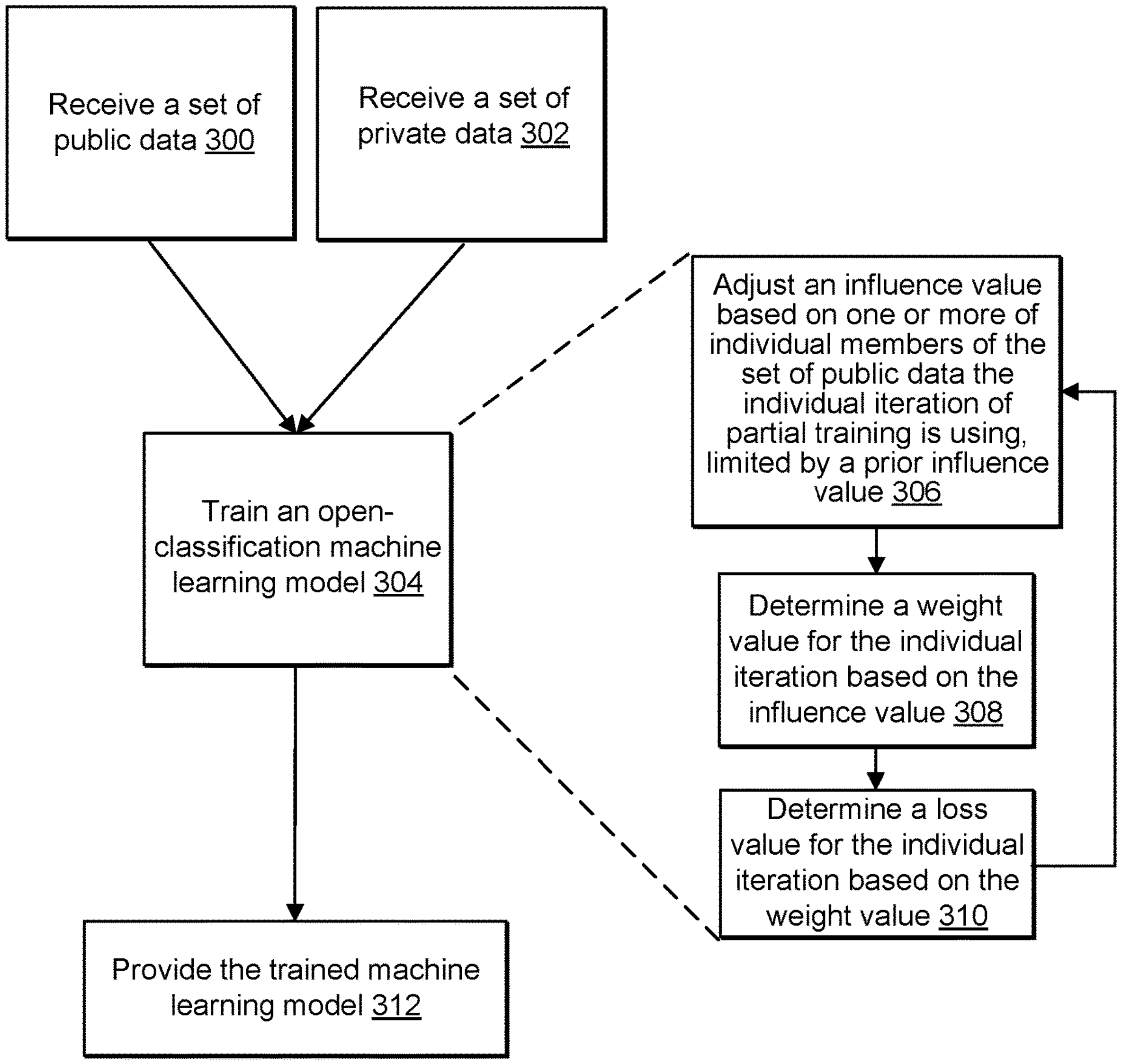
FIG. 3 is a flowchart illustrating a process of using a differentially private open-classification machine learning model training system with adaptive clipping, according to some embodiments.

FIG. 3 is a flowchart illustrating a process of using a differentially private open-classification machine learning model training system with adaptive clipping, according to some embodiments.

FIG. 3 shows a possible method of using a differentially private open-classification machine learning model training system with adaptive clipping. At 300, a model trainer receives a set of public data. A data receiver, such as data receiver 102 shown in FIG. 1, may perform this step. At 302, the model trainer receives a set of private data. A data receiver, such as data receiver 102 shown in FIG. 1, may perform this step. At 304, the model trainer trains an open-classification machine learning model with a predetermined number of iterations of 306, 308, and 310. An individual iteration of partial training uses both public data and private data. At 306, the model trainer adjusts an influence value based on one or more of individual members of the set of public data the individual iteration of partial training is using, limited by a prior influence value. An adaptive clipping system such as adaptive clipping system 110, as shown in FIG. 2, may perform this step, and this step may be performed according to the methods explained in connection to the illustrations of FIGS. 4A-6B. At 308, the model trainer determines a weight value for the individual iteration based on the influence value. A weight determiner, such as weight determiner 204 shown in FIG. 2, may perform this step. At 310, the model trainer determines a loss value for the individual iteration based on the weight value. A loss determiner, such as loss determiner 104 shown in FIG. 1, may perform this step. At 312, the model trainer provides the trained machine learning model. The trained machine learning model may be a trained open classification machine learning model such as trained open-classification machine learning model 118 shown in FIG. 1. The machine learning model prior to training may be an untrained machine learning model such as untrained machine learning model 116 shown in FIG. 1.

Figure 4A:
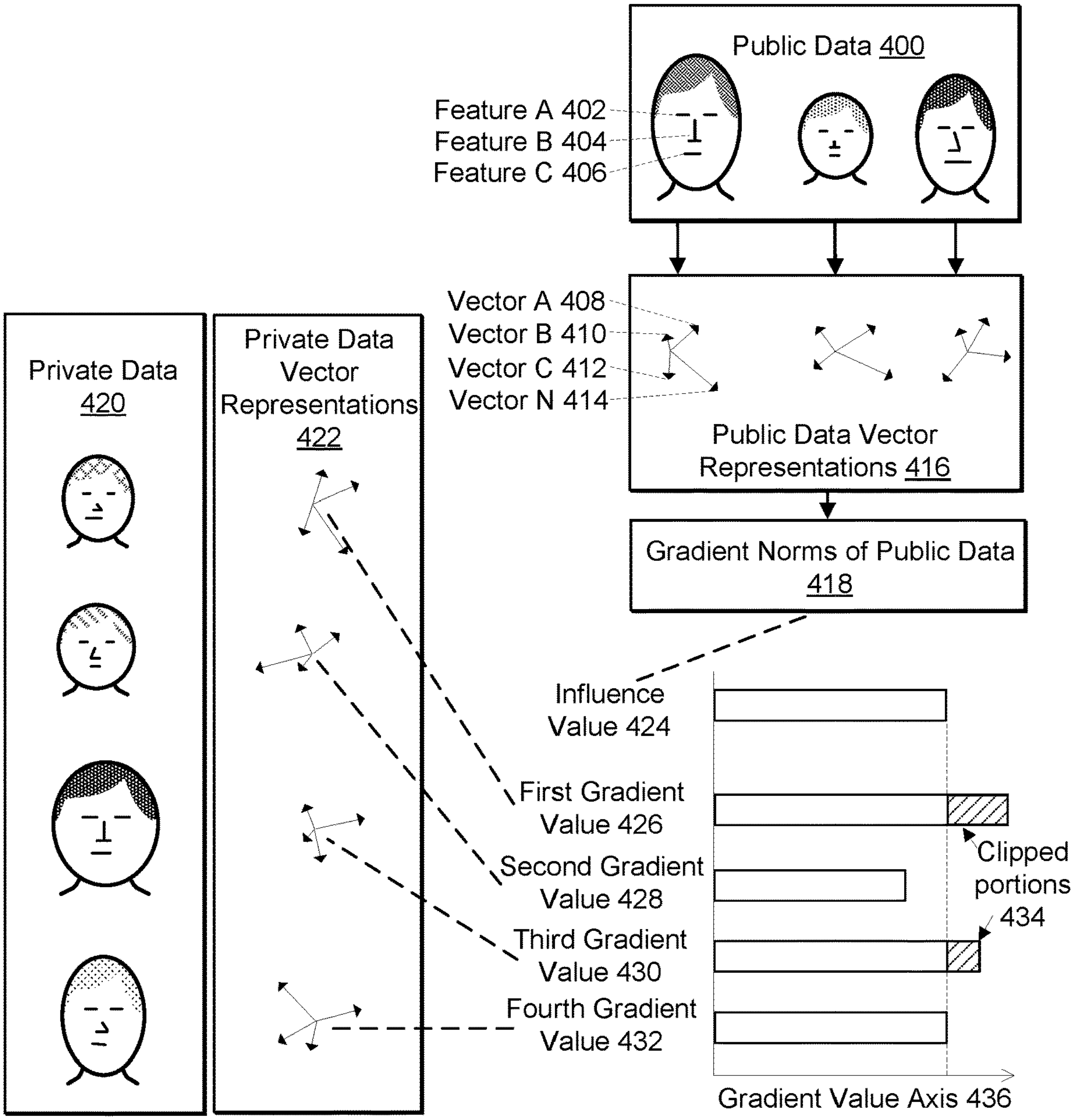
FIG. 4A is a graphical illustration of the effects of an influence value on training data and how an influence value may be determined, according to some embodiments.

FIG. 4A is a graphical illustration of the effects of an influence value on training data and how an influence value may be determined, according to some embodiments.

FIG. 4A shows the public dataset 400 and the private data 420 from which individual members of public data and individual members of private data are respectively selected. The public data 400 and the private data 420 can be extracted into, respectively, public data vector representations 416 and private data vector representations 422. A vector representation is a species of feature representations. In the example shown in FIG. 4, features A 402, B 404, and C 406 are represented by vectors A 408, B 410, and C 412 respectively. Vector N represents additional feature(s). There may be many vectors required to represent a single face image. Vectors of the vector representations may have many dimensions, despite being shown in two dimensions in this example. The public data vector representations 416 can be used to find the gradient norms of public data 418, which can be used in finding an influence value 424, as described in FIGS. 2 and 4B. The influence value 424 may be a gradient norm, and gradient values may be gradient norms.

The influence value 424 can limit the gradient values of the private data (first gradient value 426, second gradient value 428, third gradient value 430, and fourth gradient value 432, etc.). Wherever the influence value 424 falls on the gradient value axis 436, the gradient values of the private data will be limited to that point. Values above that point will be clipped, and clipped portions 434 will not be used in training the machine learning model.

Figure 4B:
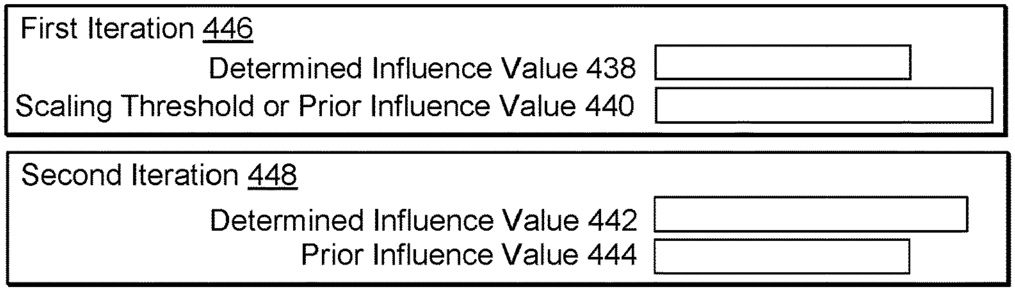
FIG. 4B is a graphical illustration of selection choices between possible influence values, according to some embodiments.

FIG. 4B is a graphical illustration of selection choices between possible influence values, according to some embodiments.

For the first iteration 446, the influence value determiner 214 may chose the lower of the determined influence value 438 as found by the quantile determiner 208 or other module that determines statistics, or the scaling threshold or prior influence value 440. If the first iteration 446 is the first iteration of partial training, no prior influence value may exist and a scaling threshold may be used by an adaptive clipping machine learning model trainer as a possible initial influence value. In this example, the determined influence value 438 is lower than the scaling threshold or prior influence value 440, so the determined influence value 438 is selected as the influence value for this iteration. In the second iteration 448, the prior influence value 444 is the selected influence value from the first iteration 446. In this example, the prior influence value 444 is lower than the determined influence value 442, so the prior influence value 444 is selected as the influence value for this iteration.

Figure 5A:
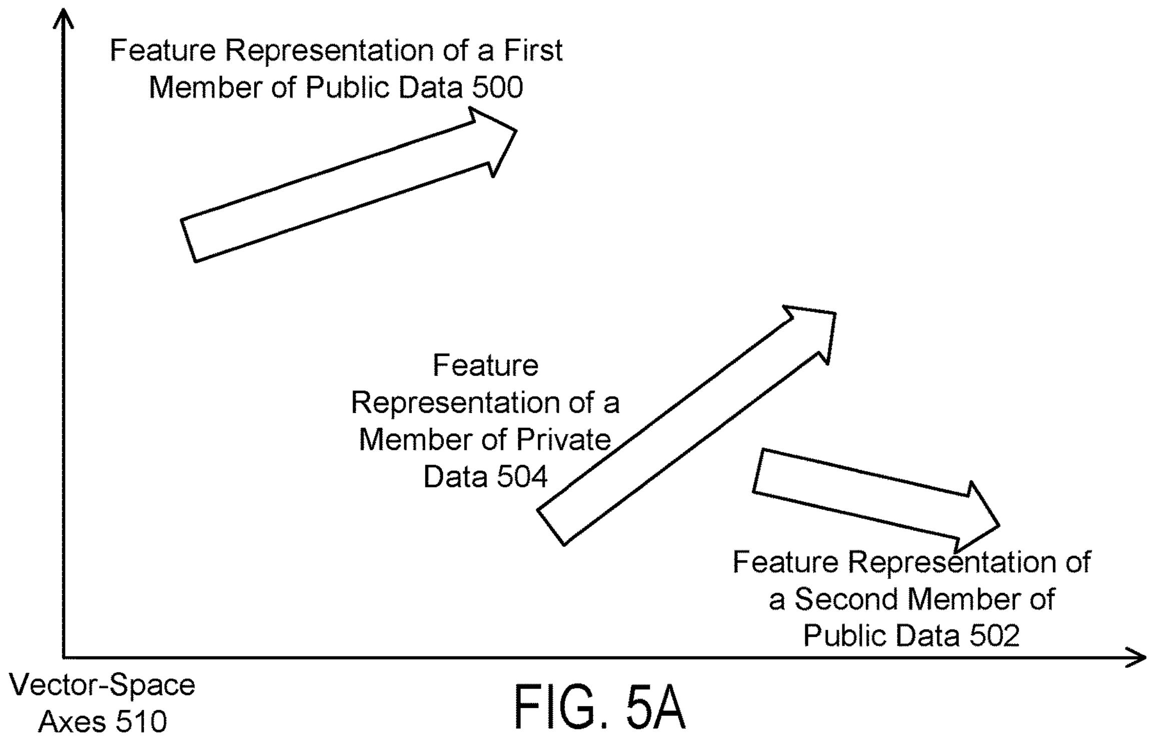
FIG. 5A is a graphical illustration of proximities between feature representations of individual members of a set of public data used in an individual iteration of partial training and feature representations of individual members of the set of private data the individual iteration of partial training is using, according to some embodiments.

FIG. 5A is a graphical illustration of proximities between feature representations of individual members of a set of public data used in an individual iteration of partial training and feature representations of individual members of the set of private data the individual iteration of partial training is using, according to some embodiments.

Feature representations, such as the vector representations in FIG. 4A, may be represented in vector-space, which is defined in this example by vector-space axes 510. The example, FIG. 5A shows a feature representation of a member of private data 504, a feature representation of a first member of public data 500, and a feature representation of a second member of public data 502. Using Euclidean distance, the feature representation of a second member of public data 502 is the nearest neighbor of the feature representation of a member of private data 504. This is because the feature representations are close together in Euclidean space. Using cosine similarity, the feature representation of a first member of public data 500 is the nearest neighbor of the feature representation of a member of private data 504. This is because the feature representations have similar angles. Note distance may be computed in various ways, where Euclidean distance and cosine distance are given as example methods of determining distance for the sake of nearest neighbor determinations The selected nearest neighbor in public data or private data may be different depending on the type of nearest neighbor calculation that is used by a nearest neighbor determiner 210, which may affect which gradient value is selected to be considered in determining the Influence value.

Figure 5B:
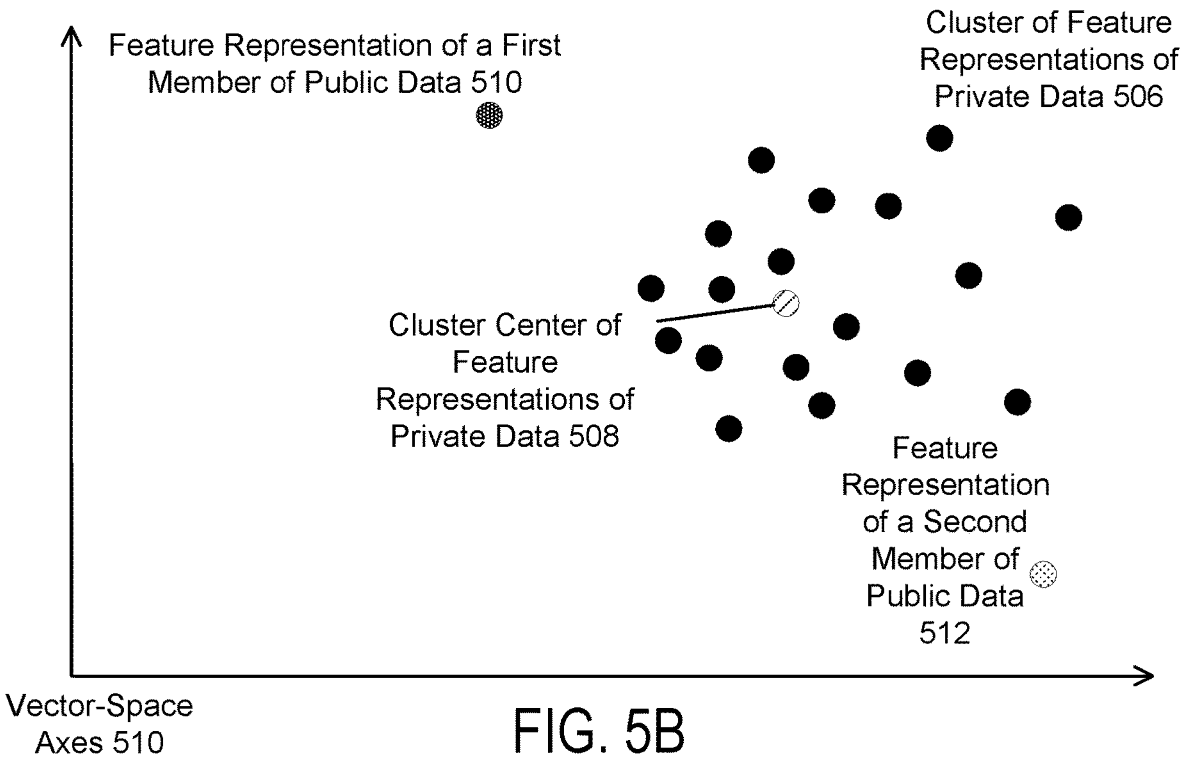
FIG. 5B is a graphical illustration of proximity between feature representations of individual members of the set of public data the individual iteration of partial training is using and individual ones of a set of cluster centers of feature representations of the one or more of the individual members of the set of private data used by the individual iteration of partial training, according to some embodiments.

FIG. 5B is a graphical illustration of proximity between feature representations of individual members of the set of public data the individual iteration of partial training is using and individual ones of a set of cluster centers of feature representations of the one or more of the individual members of the set of private data used by the individual iteration of partial training, according to some embodiments.

Loose vectors, which may be feature representations such as the ones depicted in FIG. 5B, may be represented by a point where the vector would end if the vector began at the origin. The cluster of feature representations of private data 506 has a cluster center of feature representations of private data 508, as may be determined by a cluster determiner 212. Nearest neighbor calculations, such as the ones described by FIG. 4A and performed by as nearest neighbor determiner 210, may be performed using a cluster center of feature representations of private data 508 or feature representations of individual members of private data.

Figure 6A:
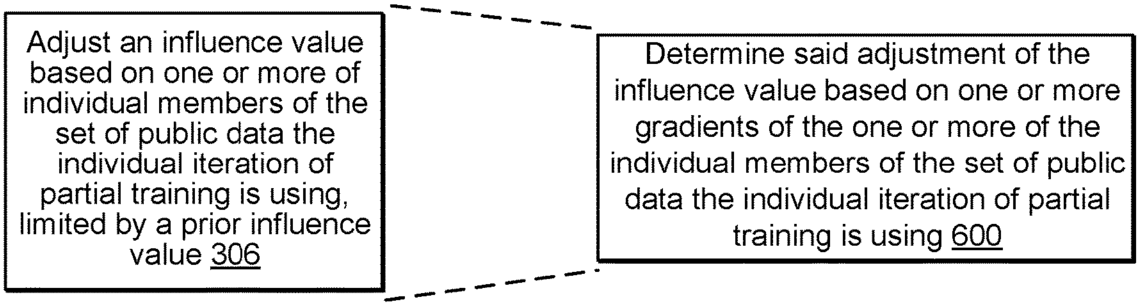
FIG. 6A is a flowchart illustrating a process of adjusting an influence value based on gradients, according to some embodiments.

FIG. 6A is a flowchart illustrating a process of adjusting an influence value based on gradients, according to some embodiments.

At 306, a model trainer adjusts an influence value based on one or more of individual members of the set of public data the individual iteration of partial training is using, limited by a prior influence value. This may be done by step 600. At 600, the model trainer determines said adjustment of the influence value based on one or more gradients of the one or more of the individual members of the set of public data the individual iteration of partial training is using. For example, the gradient norms of the set of public data may be represented as $G_{pub}$ in the equations related to calculating $C_t$ above.

Figure 6B:
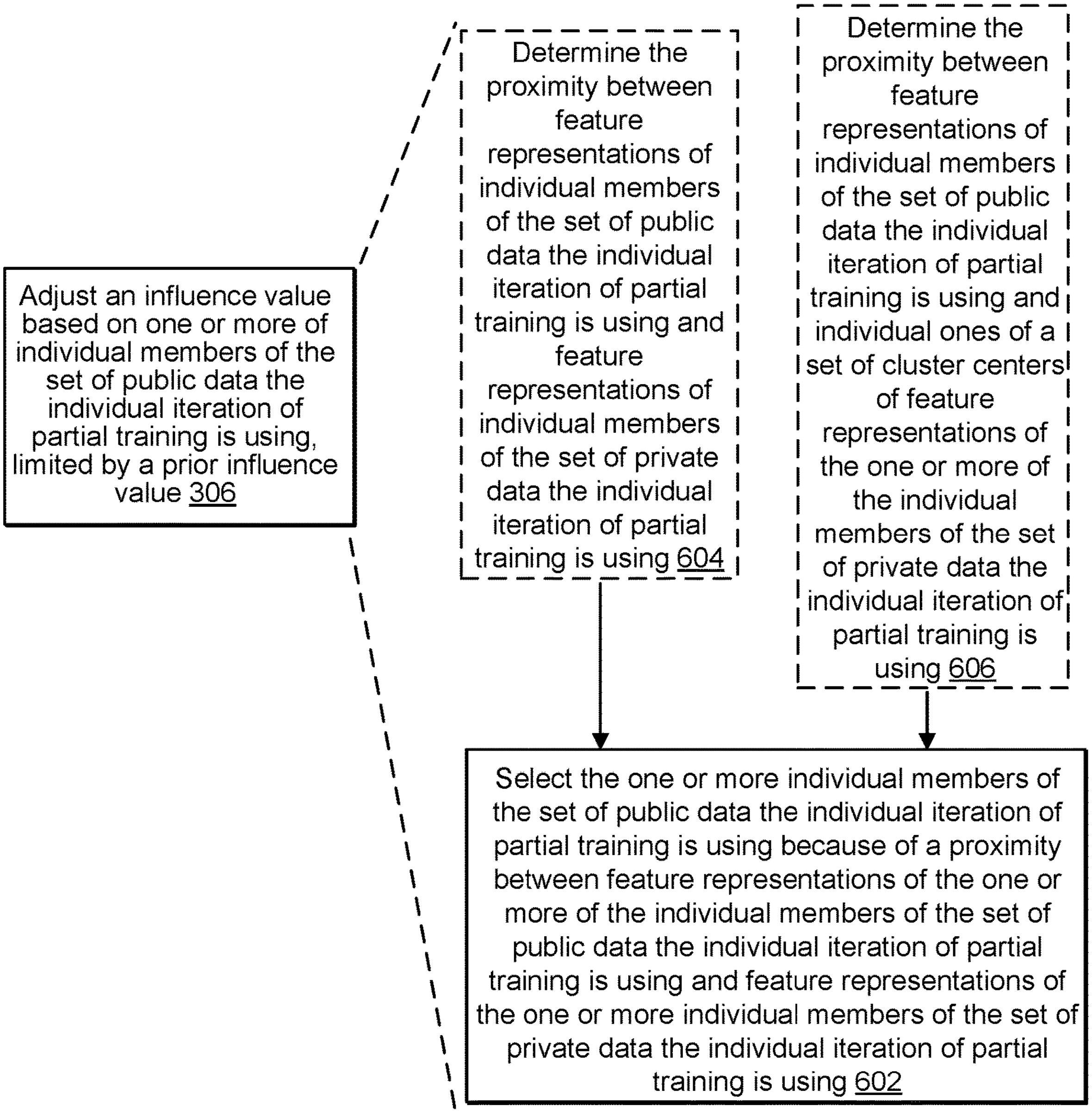
FIG. 6B is a flowchart illustrating a process of adjusting an influence value based on proximity between feature representations, according to some embodiments.

FIG. 6B is a flowchart illustrating a process of adjusting an influence value based on proximity between feature representations, according to some embodiments.

At 306, a model trainer adjusts an influence value based on one or more of individual members of the set of public data the individual iteration of partial training is using, limited by a prior influence value. The influence value may be $C_t$, as described above. The prior influence value may be $C_{t-1}$, as described above. This step may be performed by the model trainer performing one of step 604 and step 606 in addition to step 602. At 604, the model trainer determines the proximity between feature representations of individual members of the set of public data the individual iteration of partial training is using and feature representations of individual members of the set of private data the individual iteration of partial training is using. For this step, $\mathcal{N}(\mathcal{B}_{pri}, \mathcal{B}_{pub})$ represents determining the nearest $x_{pub}$ for each $x_{pri}$ by Euclidean distance or cosine similarity. At 606, the model trainer determines the proximity between feature representations of individual members of the set of public data the individual iteration of partial training is using and individual ones of a set of cluster centers of feature representations of the one or more of the individual members of the set of private data the individual iteration of partial training is using. For this step, where $\mathcal{N}(\mathcal{B}_{pri}, \mathcal{B}_{pub})$ represents determining the nearest $x_{pub}$ for a set of multiple $x_{pri}$ by Euclidean distance or cosine similarity, as described relation to FIG. 5B. At 602, the model trainer selects the one or more individual members of the set of public data the individual iteration of partial training is using because of a proximity between feature representations of the one or more of the individual members of the set of public data the individual iteration of partial training is using and feature representations of the one or more individual members of the set of private data the individual iteration of partial training is using. The selected members, or values associated with the selected members, may be represented by $G_{pub}$ [$\mathcal{N}(\mathcal{B}_{pri}, \mathcal{B}_{pub})$] as described above.

Example Computer System

FIG. 7 illustrates a block diagram illustrating an example computer system that implements some or all of the techniques described herein, according to some embodiments.

FIG. 7 illustrates exemplary computer system 700 usable to implement the machine learning model training system as described above with reference to FIGS. 1-6B. In different embodiments, computer system 700 may be any of various types of devices, including, but not limited to, a network computer, a mobile device, a consumer device, application server, storage device, a peripheral device such as a switch, modem, router, or in general any type of computing or electronic device.

Various embodiments of program instructions for the machine learning model training system, as described herein, may be executed in one or more computer systems 700, which may interact with various other devices. Note that any component, action, or functionality described above with respect to FIGS. 1-6B may be implemented on one or more computers configured as computer system 700 of FIG. 7, according to various embodiments. In the illustrated embodiment, computer system 700 includes one or more processors 710 coupled to a system memory 720 via an input/output (I/O) interface 740. Computer system 700 further includes a network interface 750 coupled to I/O interface 740, and one or more input/output devices 760. In some cases, it is contemplated that embodiments may be implemented using a single instance of computer system 700, while in other embodiments multiple such computer systems, or multiple nodes making up computer system 700, may be configured to host different portions or instances program instructions as described above for various embodiments. For example, in one embodiment some elements of the program instructions may be implemented via one or more nodes of computer system 700 that are distinct from those nodes implementing other elements.

In some embodiments, computer system 700 may be implemented as a system on a chip (SoC). For example, in some embodiments, processors 710, memory 720, I/O interface 740 (e.g., a fabric), etc. may be implemented in a single SoC comprising multiple components integrated into a single chip. For example, a SoC may include multiple CPU cores, a multi-core GPU, a multi-core neural engine, cache, one or more memories, etc. integrated into a single chip. In some embodiments, a SoC embodiment may implement a reduced instruction set computing (RISC) architecture, or any other suitable architecture.

System memory 720 may be configured to store compression or decompression program instructions for machine learning model trainer 730 accessible by one or more of the processors 710. In various embodiments, system memory 720 may be implemented using any suitable memory technology, such as static random-access memory (SRAM), synchronous dynamic RAM (SDRAM), nonvolatile/Flash-type memory, or any other type of memory. In the illustrated embodiment, program instructions for machine learning model trainer 730 may be configured to implement any of the functionalities described above. In some embodiments, program instructions and/or data may be received, sent, or stored upon different types of computer-accessible media or on similar media separate from system memory 720 or computer system 700.

In one embodiment, I/O interface 740 may be configured to coordinate I/O traffic between processor 710, system memory 720, and any peripheral devices in the device, including network interface 750 or other peripheral interfaces, such as input/output devices 760. In some embodiments, I/O interface 740 may perform any necessary protocol, timing, or other data transformations to convert data signals from one component (e.g., system memory 720) into a format suitable for use by another component (e.g., processor 710). In some embodiments, I/O interface 740 may include support for devices attached through various types of peripheral buses, such as a variant of the Peripheral Component Interconnect (PCI) bus standard or the Universal Serial Bus (USB) standard, for example. In some embodiments, the function of I/O interface 740 may be split into two or more separate components, such as a north bridge and a south bridge, for example. Also, in some embodiments, some or all of the functionality of I/O interface 740, such as an interface to system memory 1120, may be incorporated directly into processor 710.

Network interface 750 may be configured to allow data to be exchanged between computer system 700 and other devices attached to a network 770 (e.g., carrier or agent devices) or between nodes of computer system 700. Network 770 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 750 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 760 may, in some embodiments, include one or more display terminals, keyboards, keypads, touchpads, scanning devices, voice or optical recognition devices, or any other devices suitable for entering or accessing data by one or more computer systems 700. Multiple input/output devices 760 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 750.

As shown in FIG. 7, memory 720 may include program instructions for compositional face generator 730, which may be processor-executable to implement any element or action described above. In one embodiment, the program instructions may implement the methods described above. In other embodiments, different elements and data may be included.

Computer system 700 may also be connected to other devices that are not illustrated, or instead may operate as a stand-alone system. In addition, the functionality provided by the illustrated components may in some embodiments, be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising, a memory storing program instructions; and one or more processors, wherein the program instructions, when executed on or across the one or more processors, cause the one or more processors to:

train an open-classification machine learning model using a set of training data comprising a set of publicly available images and a set of non-publicly available images, wherein said training of the open-classification machine learning model is performed via a plurality of partial training iterations, wherein an individual iteration of partial training uses one or more individual members of the set of publicly available images and one or more individual members of the set of non-publicly available images; and adjust an influence value used in the plurality of partial training iterations, wherein said adjustment of the influence value is limited to a threshold level of adjustment based on a prior influence value of a prior iteration of partial training of said training of the open-classification machine learning model, and wherein the influence value:

is based on one or more gradients of the one or more of the individual members of the set of publicly available images the individual iteration of partial training is using; and limits an effect of the one or more of the individual members of the set of non-publicly available images on a weight for a loss amount of the individual iteration of partial training.

2. The system of claim 1 wherein the program instructions, when executed on or across the one or more processors cause the one or more processors to:

perform the adjustment of the influence value based on a quantile of the one or more gradients of the one or more of the individual members of the set of public data the individual iteration of partial training is using.

3. The system of claim 2 wherein the program instructions, when executed on or across the one or more processors cause the one or more processors to:

not perform the adjustment of the influence value if the adjustment would increase the influence value relative to a prior influence value of a prior iteration of partial training of said training of the open-classification machine learning model.

4. The system of claim 1 wherein the program instructions, when executed on or across the one or more processors cause the one or more processors to:

select, to base the influence value on, the one or more gradients of the one or more of the individual members of the set of publicly available images the individual iteration of partial training is using because of a proximity in a feature space between feature representations of the one or more of the individual members of the set of publicly available images the individual iteration of partial training is using and feature representations of the one or more individual members of the set of non-publicly available images the individual iteration of partial training is using.

5. The system of claim 4 wherein the program instructions, when executed on or across the one or more processors cause the one or more processors to:

determine the proximity between feature representations of individual members of the set of publicly available images the individual iteration of partial training is using and feature representations of individual members of the set of non-publicly available images the individual iteration of partial training is using.

6. The system of claim 4 wherein the program instructions, when executed on or across the one or more processors cause the one or more processors to:

determine the proximity between feature representations of individual members of the set of publicly available images the individual iteration of partial training is using and individual ones of a set of cluster centers of feature representations of the one or more of the individual members of the set of non-publicly available images the individual iteration of partial training is using.

7. The system of claim 1 wherein said open-classification machine learning model is a facial recognition model.

8. One or more non-transitory computer-readable program instructions that, when executed on or across one or more processors, cause the one or more processors to:

train an open-classification machine learning model using a set of training data comprising a set of data not subject to privacy constraints and a set of data subject to privacy constraints, wherein said training of the open-classification machine learning model is performed via a plurality of partial training iterations, wherein an individual iteration of partial training uses one or more individual members of the set of data not subject to privacy constraints and one or more individual members of the set of data subject to privacy constraints; and adjust an influence value for the plurality of partial training iterations, wherein said adjustment of the influence value is limited to a threshold level based on a prior influence value of a prior iteration of partial training of said training of the open-classification machine learning model, and wherein the influence value:

is based on one or more of the individual members of the set of data not subject to privacy constraints the individual iteration of partial training is using, and limits an effect of the one or more of the individual members of the set of data subject to privacy constraints on a weight for a loss amount of the individual iteration of partial training.

9. The non-transitory computer-readable program instructions of claim 8 wherein the program instructions, when executed on or across one or more processors, further cause the one or more processors to:

adjust the influence value based on one or more gradients of the one or more of the individual members of the set of data not subject to privacy constraints the individual iteration of partial training is using.

10. The non-transitory computer-readable program instructions of claim 8 wherein the program instructions, when executed on or across one or more processors, further cause the one or more processors to:

adjust the influence value based on a quantile of one or more gradients of the one or more of the individual members of the set of data not subject to privacy constraints the individual iteration of partial training is using.

11. The non-transitory computer-readable program instructions of claim 8 wherein the program instructions, when executed on or across one or more processors, further cause the one or more processors to:

select the one or more of the individual members of the set of data not subject to privacy constraints the individual iteration of partial training is using because of a proximity in a feature space between feature representations of the one or more of the individual members of the set of data not subject to privacy constraints the individual iteration of partial training is using and feature representations of the one or more individual members of the set of data subject to privacy constraints the individual iteration of partial training is using.

12. The non-transitory computer-readable program instructions of claim 11 wherein the program instructions, when executed on or across one or more processors, further cause the one or more processors to:

determine the proximity between feature representations of individual members of the set of data not subject to privacy constraints the individual iteration of partial training is using and feature representations of individual members of the set of data subject to privacy constraints the individual iteration of partial training is using.

13. The non-transitory computer-readable program instructions of claim 11 wherein the program instructions, when executed on or across one or more processors, further cause the one or more processors to:

determine the proximity between feature representations of individual members of the set of data not subject to privacy constraints the individual iteration of partial training is using and individual ones of a set of cluster centers of feature representations of the one or more of the individual members of the set of data subject to privacy constraints the individual iteration of partial training is using.

14. The non-transitory computer-readable program instructions of claim 1 wherein the influence value is bounded by a scaling threshold.

15. A method, comprising, training an open-classification machine learning model using a set of training data comprising a set of data not subject to privacy constraints and a set of data subject to privacy constraints, wherein said training of the open-classification machine learning model is performed via a plurality of partial training iterations, wherein an individual iteration of partial training uses one or more individual members of the set of data not subject to privacy constraints and one or more individual members of the set of data subject to privacy constraints; and adjusting an influence value for the plurality of partial training iterations, wherein said adjusting of the influence value is limited to a threshold level based on a prior influence value of a prior iteration of partial training of said training of the open-classification machine learning model, and wherein the influence value:

is based on one or more of the individual members of the set of data not subject to privacy constraints the individual iteration of partial training is using, and limits an effect of the one or more of the individual members of the set of data subject to privacy constraints on a weight for a loss amount of the individual iteration of partial training.

16. The method of claim 15 further comprising determining said adjustment of the influence value based on one or more gradients of the one or more of the individual members of the set of data not subject to privacy constraints the individual iteration of partial training is using.

17. The method of claim 16 wherein said determining said adjustment of the influence value is based on a quantile of the one or more gradients of the one or more of the individual members of the set of data not subject to privacy constraints the individual iteration of partial training is using.

18. The method of claim 15 further comprising selecting, to base the influence value on, the one or more of the individual members of the set of data not subject to privacy constraints the individual iteration of partial training is using because of a proximity between feature representations of the one or more of the individual members of the set of data not subject to privacy constraints the individual iteration of partial training is using and feature representations of the one or more individual members of the set of data subject to privacy constraints the individual iteration of partial training is using.

19. The method of claim 18 further comprising determining the proximity between feature representations of individual members of the set of data not subject to privacy constraints the individual iteration of partial training is using and feature representations of individual members of the set of data subject to privacy constraints the individual iteration of partial training is using.

20. The method of claim 18 further comprising determining the proximity between feature representations of individual members of the set of data not subject to privacy constraints the individual iteration of partial training is using and individual ones of a set of cluster centers of feature representations of the one or more of the individual members of the set of data subject to privacy constraints the individual iteration of partial training is using.

* * * * *